United States Patent [19]

Ziegler

[11] 4,176,776

[45] Dec. 4, 1979

[54] FILM-TRANSPORT MECHANISM FOR MOTION-PICTURE PROJECTORS, AND THE LIKE

[75] Inventor: Karl Ziegler, Nellingen, Fed. Rep. of Germany

[73] Assignee: Robert Bosch GmbH, Stuttgart, Fed. Rep. of Germany

[21] Appl. No.: 857,043

[22] Filed: Dec. 2, 1977

[30] Foreign Application Priority Data

Dec. 9, 1976 [DE]  Fed. Rep. of Germany ....... 2655821

[51] Int. Cl.² .............................................. G03B 1/22
[52] U.S. Cl. ......................................... 226/51; 226/65; 226/70
[58] Field of Search .................. 226/51, 62, 64, 65, 226/66, 70, 71, 72; 352/194, 195, 196

[56] References Cited

U.S. PATENT DOCUMENTS

| | | | |
|---|---|---|---|
| 3,612,370 | 10/1971 | Thevanaz | 226/65 |
| 3,640,441 | 2/1972 | Keznickl | 352/195 |

*Primary Examiner*—Allen N. Knowles
*Attorney, Agent, or Firm*—Michael J. Striker

[57] ABSTRACT

A single rotary cam has one cam track which controls movement of the transport claw in both the forward and reverse film-transport directions. The cam track is so configured that the claw motion constituting the one-frame advancement motion for forward transport constitutes part of the return stroke during reverse transport, and vice versa. The cam-track configuration is such that, despite the constancy of the motion performed by the claw, the position of projected frames is unchanged when switching over between forward- and reverse-transport modes of operation.

6 Claims, 10 Drawing Figures

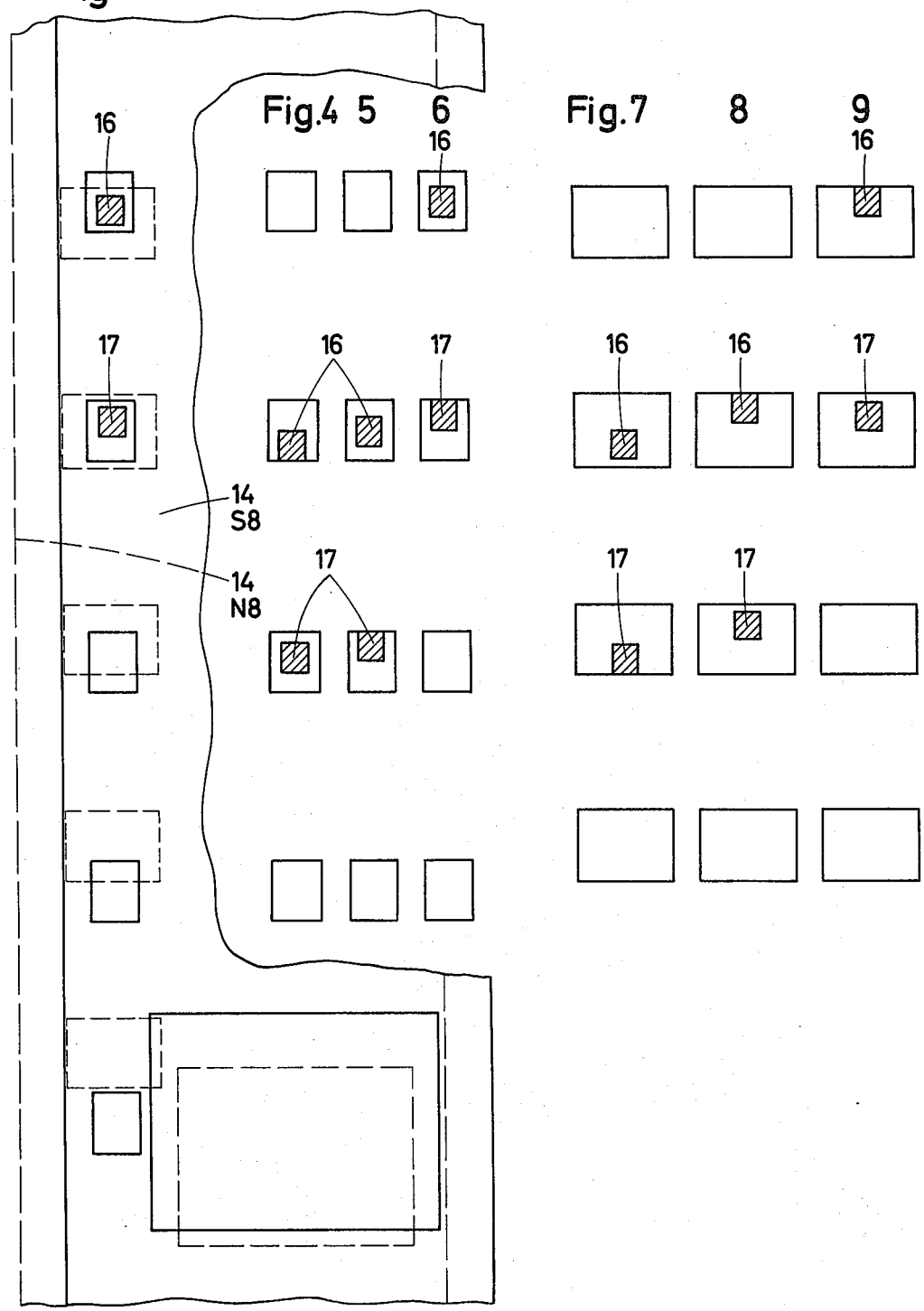

FILM-TRANSPORT MECHANISM FOR MOTION-PICTURE PROJECTORS, AND THE LIKE

BACKGROUND OF THE INVENTION

The invention relates to film-transport mechanisms for motion-picture projectors, and the like. The type of mechanism in question is one in which a rotary cam controls the movements of the transport claw in the direction of forward and reverse film transport, and in which the cam is so designed that one sector effects one-frame advancement in the forward-transport mode of operation, another sector effects one-frame advancement in the reverse-transport mode of operation, but the direction of rotation of the cam is the same for both modes of operation.

With transport mechanisms of this type, it has not been possible to automatically achieve frame-line equalization upon transport-direction switchovers using only a single cam follower. German published patent application DT-OS No. 2,302,803 discloses a transport mechanism utilizing two cam followers. Frame-line equalization is achieved utilizing the play of whichever of the two cam followers is out of engagement with the cam track relative to the part of the cam track located furthest from the cam rotation axis. With increasing wear, this play increases, and the shifting of the frame lines which occurs upon a reversal of transport direction becomes overcompensated, causing frame location errors to arise. Also, the manufacturing tolerances required for the mounting of the cam follower and for its point of coupling to the transport claw are disadvantageous upon direction reversals.

SUMMARY OF THE INVENTION

It is a general object of the invention to provide a transport mechanism of the type in question, but so designed that progressive wear does not alter its ability to maintain frame-line height constant upon transport-direction reversals, and so designed that the quality and character of transport is identical for both directions of transport with respect to frame positioning, low film wear and operating noise.

According to the general concept of the invention this is achieved using a rotary cam which rotates in one and the same direction, for both forward and reverse film transport, and has a single cam track including two angularly spaced sectors. The first sector causes the transport claw to move in the direction of forward transport through a distance $S_1$ and then through a distance $S_2$ and then in the reverse-transport direction through a distance $S_3$. The second sector then causes the transport claw to move in the reverse-transport direction through a distance $S_4$ and then through a distance $S_5$ and then in the forward-transport direction through a distance $S_6$, completing the cycle of movement of the claw. When operating in the forward-transport mode, the movement through the distance $S_2$ constitutes the one-frame film-advancement motion of the claw per se; when operating in the reverse transport mode, the movement through distance $S_2$ constitutes part of the return stroke of the claw. Likewise, when operating in the reverse-transport mode, the movement through the distance $S_5$ constitutes the film-advancement motion per se; when operating in the forward-transport mode, the movement through distance $S_5$ constitutes part of the return stroke of the claw. The total distances $S_1+S_2+S_3+S_4+S_5+S_6$ through which the transporting end of the transport claw moves per frame-advancement cycle is equal to twice the actual one-frame film-advancement distance (i.e., is equal to $S_2+S_5$) plus twice the idle motion of the claw (i.e., twice $S_3+S_4$ or equivalently twice $S_6+S_1$). The idle motion of the toothed claw is that distance through which the claw must move from a first position in which a tooth thereof abuts against the edge of a perforation (so as to be capable of film transport in one direction) to a second position in which a tooth thereof abuts against an opposite-sense edge of a perforation (so as to be capable of film transport in the other direction). With these relationships, the position of projected frames will not be changed when one switches over back and forth between forward and reverse projection modes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 depicts a section of super-8 8-mm motion-picture film and also a section of normal 8-mm motion-picture film, showing the teeth of a two-tooth transport claw in engagement with perforations of the films;

FIGS. 4-6 depict three further positions of the teeth of the claw, for super-8 8-mm film;

FIGS. 7-9 depict three further positions of the teeth of the claw, for normal 8-mm film.

DESCRIPTION OF THE PREFERRED EMBODIMENTS

Figure 1:
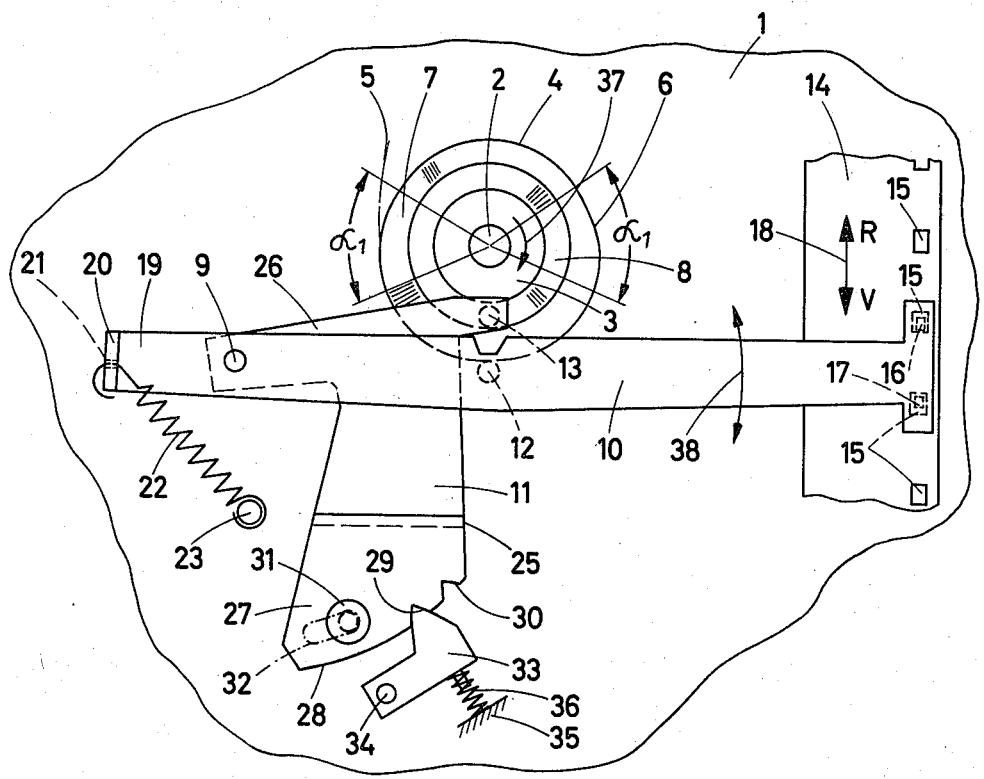
FIG. 1 depicts a transport mechanism embodying the invention.

Numeral 1 denotes the housing of a motion-picture projector, or motion-picture camera or other analogous device. Mounted in the housing 1 is a shaft 2 on which is secured a rotary cam 3. Cam 3 has a one-track camming surface for film transport, here its peripheral surface 4. Camming surface 4 includes two camming surface sectors 5 and 6. Each occupies an angular span $alpha_1$. The sections of camming surface 4 intermediate the sectors 5, 6 are of constant radius. Camming surface sector 5 effects one-frame film advancement during forward film transport; camming surface sector 6 effects one-frame film advancement during reverse film transport. Cam 3 always turns in the direction of arrow 37, i.e., for both forward and reverse film transport.

The end face of cam 3 is provided with two camming surfaces 7, 8, located at different radial distances relative to the rotation axis of cam 3. Radially outer camming surface 7 controls engagement with film perforations, when the projector is operating in its forward-transport mode; radially inner camming surface 8 controls engagement with film perforations, when the projector is operating in its reverse-transport mode.

A bearing 9 mounted on housing 1 pivotally mounts a film-transport claw 10 and an intermediate lever 11. A pin 12 on the film-transport claw 10 serves as a cam follower, and tracks the peripheral surface 4 of cam 3. A pin 13 on the intermediate lever 11 serves as a cam follower, and tracks the camming surfaces 7 and 8 alternatively; depending upon the radial distance of tracking pin 13 from shaft 2, pin 13 will track the camming surface 7 or else the camming surface 8.

Numeral 14 denotes a film guided through the housing of the apparatus, and numeral 15 the film perforations. The free end of film-transport claw 10 has two teeth 16, 17 which can enter into perforations 15. Arrow 18 indicates the direction of forward and reverse film transport, V indicating forward transport and R reverse transport.

The left arm 19 of transport claw 10 ends in an angled tab 20 having an aperture 21. One end of a tension spring 22 is secured in aperture 21, and its other end secured on a pin 23 mounted on a housing wall 24. Tension spring 22 urges transport claw 10 counterclockwise (as viewed in FIG. 1), causing the cam-follower pin 12 to be urged into tracking engagement with peripheral camming surface 4.

The intermediate lever 11 is doubly angled and comprises a middle flat part 25 and, perpendicular thereto, two mutually parallel flat parts 26 and 27. Part 26 is the part of lever 11 pivotally mounted on bearing 9 and is the part provided with the tracking pin 13. Part 27 has an edge 28 which is circular and concentric with bearing 9. Edge 28 includes two notches 29, 30. Mounted on part 27 of intermediate lever 11 is a manual control 31 which projects through a slot 32 in a housing wall 24, so as to be externally accessible to the user of the apparatus. A detent 33 is pivotally mounted on a pin 34, and is capable of engaging either one of the two notches 29, 30. Pin 34 is mounted on housing wall 24. Detent 33 is urged into engagement with one or the other of notches 29, 30 by a compression spring 36 braced against a projection 35 of the housing wall. The user externally shifts manual control 31, to cause detent 33 to engage one or the other of the two notches 29, 30, for either forward or reverse film transport. When detent 33 engages notch 29, then (as shown) tracking pin 13 tracks the radially inner camming surface 8, for reverse film transport; when detent 33 engages notch 30, then tracking pin 13 engages the radially outer camming surface 7, for forward film transport.

Bearing 9 mounts transport claw 10 and intermediate lever 11 for pivoting movement in two different senses. Arrow 38 indicates the first sense in which elements 10, 11 can pivot, referred to for simplicity as up and down; arrow 39 indicates the second sense in which elements 10, 11 can pivot, referred to as in and out. Tension spring 22 not only urges claw 10 counterclockwise (as viewed in FIG. 1) but also in a sense causing the teeth 16, 17 to enter film perforations 15 (see the upper arrowhead of arrow 39 in FIG. 2). In other words spring 22 urges claw 10 counterclockwise (as viewed in FIG. 2), and thereby claw 10 presses lever 11 and in particular the tracking pin 13 thereof against one or the other of the in-out camming surfaces 7, 8.

Figure 2:
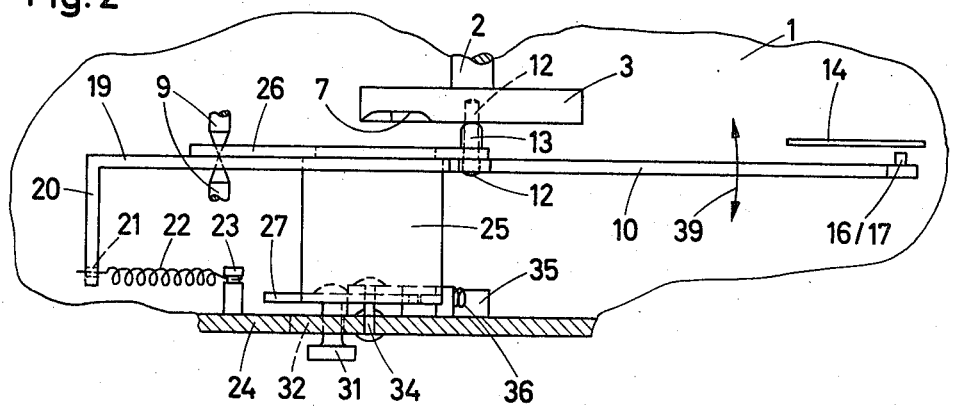
FIG. 2 is a top view looking down on the structure of FIG. 1.

During each rotation of the cam 3, the right end of transport claw 10 performs a complete cycle of movement in the direction of arrow 38 in FIG. 1, and a complete cycle of movement in the direction of arrow 39 in FIG. 2. The cycle of movement in the direction of arrow 38 is graphically depicted by line 40 in FIG. 10, which is a plot of the location of the end of claw 10 versus the angular position of the cam 3.

Figure 10:
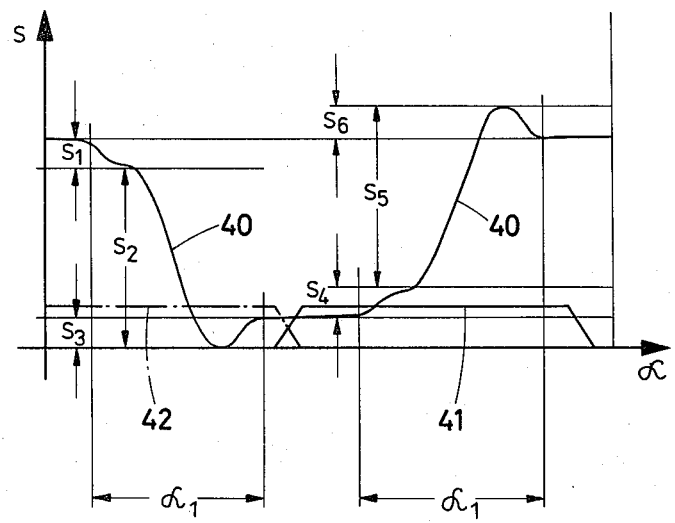
FIG. 10 is a graphical depiction of the forward and reverse motions of the transport claw and of its in and out movements during the course of one rotation of the rotary control cam of the transport claw.

Starting at the origin in FIG. 10, tracking pin 12 is tracking the constant-radius sector of the cam periphery at the top of cam 3 (as viewed in FIG. 1). During this interval, the height of the end of claw 10 is constant.

Next, camming sector 5 arrives at tracking pin 12, and begins to lower the free end of the claw 10, first through a distance $S_1$ and then through a further distance $S_2$.

As camming sector 5 lowers claw 10 through distance $S_1$, it will be seen from FIG. 10 that the initial rate of descent of the claw is low, then considerably quicker, and then low again.

As camming sector 5 lowers claw 10 through the distance $S_2$, it will be seen that the rate of descent of the claw 10 is quite high. This quick descent of the right end of claw 10 through the distance $S_2$ is the actual one-frame film-transport motion of the claw 10, assuming that the teeth 16, 17 of claw 10 are in engagement with film perforations 15. Such engagement will at this time be in existence if the projector has been set for forward transport; if the projector has been set for reverse transport, then this movement of claw 10 through distance $S_2$ is not the one-frame transport movement, but instead part of the return stroke of the transport claw 10.

Finally, the trailing part of camming sector 5 causes the end of claw 10 to rise through the distance $S_3$.

Next, the constant-radius sector which follows upon camming sector 5 keeps the end of the claw 10 at constant height.

Then, the leading end of camming sector 6 arrives at tracking pin 12, and the end of claw 10 is raised by section 6 first through a distance $S_4$ and then through a distance $S_5$. The rise through distance $S_4$ and then distance $S_5$ corresponds to the earlier described descent through distance $S_1$ and distance $S_2$.

Specifically, the rise through the distance $S_4$ is performed with a speed which decreases to a low value at the end of this rise, just like the descent through the distance $S_1$ ended at low speed.

When the rise through the subsequent distance $S_5$ commences, this rise is at high speed. This rise through distance $S_5$ constitutes the actual one-frame film-transport motion of the claw, if the projector has been set for reverse-transport operation and the teeth of claw 10 are in film perforations 15. If the projector is in its forward-transport mode, then this rise through distance $S_5$ is merely part of the return stroke of the transport claw 10.

Then, the trailing part of camming sector 6 lowers the end of claw 10 through a distance $S_6$.

After this, the next-following constant-radius sector of cam 3 reaches tracking pin 12, so that the end of claw 10 stays at the height most recently reached. This is the same height which the end of claw 10 has prior to the descent through distance $S_1$, and the cycle of movement in the direction of arrow 38 (FIG. 1) is now complete.

The cycle of movement in the direction of arrow 39 (FIG. 2) is also depicted in FIG. 10, by means of the trapezoids 41 and 42.

Trapezoid 41 represents the movement of the end of claw 10 in the direction of arrow 39, if the projector is in its reverse-transport mode. Prior to the one-frame advancement through distance $S_5$, the teeth 16, 17 of claw 10 enter into respective perforations 15, and stay therein during the reverse-transport one-frame advancement through distance $S_5$. The teeth 16, 17 do not leave these perforations 15 until after they have been lowered through the distance $S_6$.

42 Represents the movement of the end of claw 10 in the direction of arrow 29, if the projector is in its forward-transport mode. Prior to the one-frame advancement through the distance $S_2$, the teeth 16, 17 of claw 10 have entered into perforations 15, and stay therein during the forward-transport one-frame advancement through distance $S_2$. The teeth 16, 17 do not leave these perforations 15 until they have been raised through the distance $S_3$.

What constitutes the one-frame transport motion of the claw in the forward-transport mode of the projector constitutes part of the return stroke of the claw in the reverse-transport mode of the projector, and vice versa.

The distances $S_1$, $S_3$, $S_4$ and $S_6$ are here all equal. Furthermore, each of these distances is equal to one half the idle-motion distance of the end of the transport claw 10, measured from a first position in which one tooth engages the edge of its perforation for transport in one direction to a second position in which the other tooth engages the edge of its perforation for transport in the opposite direction.

FIG. 3 together with FIGS. 4–6 depict the engagement of the teeth 16, 17 with perforations of super-8 8-mm film; FIG. 3 together with FIGS. 7–9 depict the engagement of the teeth 16, 17 with perforations of normal 8-mm film. In FIG. 3, super-8 8-mm film is depicted in solid lines, and normal 8-mm film is depicted in broken lines.

FIG. 3 depicts the starting position of the teeth, in which the facing sides of the teeth 16, 17 are spaced equal distances from the respective interperforation webs nearest to them. In FIG. 4, the upper tooth 16 engages the interperforation web beneath it and has transported the film one frame forward, relative to FIG. 3. FIG. 5 depicts the positions of teeth 16, 17 at the start of a reverse-transport one-frame advancement. Here, the lower tooth 17 bears against the interperforation web above it, and reverse transport can begin. The positions of the teeth 16, 17 shown in FIG. 6, correspond to the lower tooth 17 having effected one-frame reverse film transport, after which the forward displacement of the transporting tooth 17 away from the upper interperforation web back to the FIG. 3 position can begin. FIGS. 3–6 make it clear that, when super-8 8-mm film is transported, whether forward or in reverse, the tooth that performs actual transport is the second tooth, considered in the transport direction.

FIGS. 3 and 7–9 show the situation for normal 8-mm film. FIG. 3 again depicts the neutral or starting position of the teeth. FIG. 7 depicts the lower tooth 17 after it is pushed the film one-frame in forward direction in engagement with the interperforation web beneath it. In FIG. 8, the tooth 17 is shown moved away from the interperforation web which it has just pushed down, and the upper tooth 16 now in engagement with the web above it. FIG. 9 depicts the teeth 16, 17 at the end of a one-frame reverse-transport motion. Here likewise, there next occurs a retracting phase, in which the teeth 16, 17 are returned to the starting position in FIG. 3. FIGS. 3 and 7–9 make clear that, when transporting normal 8-mm film, in either the forward or reverse direction, the tooth which actually effects transport is always the first tooth, considered in the direction of transport. FIGS. 3–9, considered together, make clear that, although the cycle of motion of the two teeth 16, 17 is constant, frame-position constancy is achieved for switchovers between forward and reverse film transport.

It will be understood that each of the elements described above, or two or more together, may also find a useful application in other types of constructions differing from the types described above.

While the invention has been illustrated and described as embodied in the intermittent of a motion-picture projector, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An intermittent for motion-picture projectors and the like in which film is transported in forward and reverse directions along a predetermined path, the intermittent comprising, in combination, a film transport claw provided with at least one film-perforation-engaging tooth;

means mounting the claw for movement in the direction of forward and reverse film transport and mounting the claw for movement in a direction transverse thereto for entry of the tooth into and withdrawal from film perforations;

rotary cam means coupled to the transport claw and operative for controlling movement of the claw in the forward and reverse film transport directions;

in-out control means operating in synchronism with the rotary cam means for controlling the movement of the claw in the direction of entry of the tooth into and withdrawal from film perforations, including means for selecting a forward-transport mode of operation establishing a forward-transport in-movement and a forward-transport out-movement and a reverse-transport mode of operation establishing a reverse-transport in-movement and a reverse-transport out-movement;

the rotary cam means comprising a rotating cam which rotates in one and the same direction for both forward-transport and reverse-transport operation, the rotating cam having one cam track which controls the movement of the claw in the film-transport direction for both the forward- and reverse-transport modes of operation, the one cam track having first and secondary angularly spaced camming sectors, the first sector being configured to cause the claw tooth to move in the stated order through a distance $S_1$ in the forward-transport direction, thereafter through a distance $S_2$ in the forward-transport direction, and thereafter through a distance $S_3$ in the reverse-transport direction, the second sector being configured to cause the claw tooth to move in the stated order through a distance $S_4$ in the reverse-transport direction, thereafter through a distance $S_5$ in the reverse-transport direction, and thereafter through a distance $S_6$ in the forward-transport direction, the forward-transport out-movement and the reverse-transport in-movement occurring subsequent to completion of the $S_3$ movement and prior to initiation of the $S_4$ movement, the forward-transport in-movement and the reverse-transport out-movement occurring subsequent to completion of the $S_6$ movement and prior to initiation of the $S_1$ movement, the $S_2$ movement constituting the one-frame film-advancement motion of the transport claw for forward film transport but constituting a part of the return stroke of the claw for reverse film transport, the $S_5$ movement constituting the one-frame film-advancement motion of the transport claw for reverse film transport but constituting a part of the return stroke of the claw for forward film transport, the claw, when a transport-effecting tooth thereof is engaging the leading edge of a film perforation and effecting film transport in one direction, needing to move in the opposite direction a predetermined distance before a transport-effecting tooth of the claw reaches and engages the leading edge of a film perforation for effecting film transport in the opposite direction, said predetermined distance being equal to the sum of the distances $S_3 + S_4$ and being equal to the sum of the distances $S_1 + S_6$, whereby:

during forward transport the $S_1$ movement is a movement in which the transport-effecting tooth of the claw is in a film perforation and moves into engagement with the leading edge of such perforation to commence the performance of the $S_2$ one-frame forward-transport motion, during forward transport the $S_3$ movement is a movement in which the transport-effecting tooth of the claw is in a film perforation and moves out of engagement with the leading edge of such perforation preliminary to leaving such perforation, during reverse transport the $S_4$ movement is a movement in which the transport-effecting tooth of the claw is in a film perforation and moves into engagement with the leading edge of such perforation to commence the performance of the $S_5$ one-frame reverse-transport motion, during reverse transport the $S_6$ movement is a movement in which the transport-effecting tooth of the claw is in a film perforation and moves out of engagement with the leading edge of such perforation preliminary to withdrawing from such perforation.

2. The intermittent defined in claim 1, the angular spans of the first and second camming sectors being equal, the angular span between the trailing end of the first sector and the leading end of the second sector being equal to the angular span between the trailing end of the second sector and the leading end of the first sector, the configuration of the first camming sector proceeding from the leading to the trailing end thereof being the same as the configuration of the second camming sector proceeding from the trailing to the leading end of the second sector, but the camming height of the two sectors differing by an amount corresponding to the distance $S_3$.

3. The intermittent defined in claim 1, the transport claw having first and second perforation-engaging teeth, the shortest distance between the two teeth and the lengths of the two teeth measured in the film transport direction being such that the two teeth can enter into respective ones of two perforations of both normal 8-mm and super-8 8-mm motion-picture film, said shortest distance and said lengths being such that only the first tooth can effect forward transport of super-8 film, only the first tooth can effect reverse transport of normal 8-mm film, only the second tooth can effect reverse transport of super-8 film, and only the second tooth can effect forward transport of normal 8-mm film.

4. The intermittent defined in claim 3, the shortest distance between the two teeth being approximately 3.31 mm, the length of each tooth measured in the film transport direction being approximately 0.56 mm.

5. The intermittent defined in claim 1, the first and second camming sectors being configured such that the transport-effecting tooth of the transport claw moves through the terminal part of the $S_1$ distance and through the terminal part of the $S_4$ distance at decreased acceleration relative to the deceleration through the preceding parts of the $S_1$ and $S_4$ distances for both super-8 8-mm and normal 8-mm film.

6. The intermittent defined in claim 1, the distances $S_3$ and $S_6$ being equal.

* * * * *